United States Patent
Brunner et al.

(10) Patent No.: US 8,358,351 B2
(45) Date of Patent: Jan. 22, 2013

(54) AUTOMATIC TONE MAPPING FOR CAMERAS

(75) Inventors: Ralph Brunner, Cupertino, CA (US); Mark Zimmer, Aptos, CA (US); Guy Cote, San Jose, CA (US)

(73) Assignee: Apple Inc., Cupertino, CA (US)

( * ) Notice: Subject to any disclaimer, the term of this patent is extended or adjusted under 35 U.S.C. 154(b) by 649 days.

(21) Appl. No.: 12/479,629

(22) Filed: Jun. 5, 2009

(65) Prior Publication Data

US 2010/0309346 A1 Dec. 9, 2010

(51) Int. Cl.
*H04N 5/228* (2006.01)
*H04N 5/202* (2006.01)

(52) U.S. Cl. .............. 348/222.1; 348/254; 382/166

(58) Field of Classification Search .......... 348/222.1, 348/254, E05.022
See application file for complete search history.

(56) References Cited

U.S. PATENT DOCUMENTS

| | | | |
|---|---|---|---|
| 6,417,698 B1 * | 7/2002 | Williams et al. | 326/93 |
| 7,023,580 B2 * | 4/2006 | Zhang et al. | 358/1.9 |
| 2005/0024522 A1 * | 2/2005 | Nakami et al. | 348/362 |
| 2007/0081721 A1 | 4/2007 | Xiao et al. | |
| 2007/0223813 A1 * | 9/2007 | Segall et al. | 382/166 |
| 2008/0088858 A1 | 4/2008 | Marcu et al. | |
| 2008/0089580 A1 * | 4/2008 | Marcu | 382/162 |
| 2008/0253758 A1 | 10/2008 | Yap et al. | |
| 2008/0317358 A1 | 12/2008 | Bressan et al. | |
| 2009/0060367 A1 * | 3/2009 | Wei | 382/260 |
| 2009/0092340 A1 * | 4/2009 | Arguelles | 382/306 |

* cited by examiner

*Primary Examiner* — Hung Lam
(74) *Attorney, Agent, or Firm* — Wong, Cabello, Lutsch, Rutherford & Brucculeri, L.L.P.

(57) ABSTRACT

A device, method, computer useable medium, and processor programmed to automatically generate tone mapping curves in a digital camera based on image metadata are described. By examining image metadata from a digital camera's sensor, such as the light-product, one can detect sun-lit, high-light, and low-light scenes. Once the light-product value has been calculated for a given image, a tone mapping curve can automatically be generated within the sensor and adjusted appropriately for the scene based on predetermined parameters. Further, it has been determined that independently varying the slopes of the tone mapping curve at the low end ($S_0$) and high end ($S_1$) of the curve results in more visually appealing images. By dynamically and independently selecting $S_0$ and $S_1$ values based on image metadata, more visually pleasing images can be generated.

24 Claims, 7 Drawing Sheets

AUTOMATIC TONE MAPPING FOR CAMERAS

BACKGROUND

The digital image sensor, such as a charged coupled device (CCD), of a digital camera has a plurality of photo-sites arranged in a colored filtered array or pattern, such as a RGB Bayer pattern. In the RGB Bayer pattern, each photo-site is filtered so that it is receptive to either: red, green, blue, or some variation thereof. The type of colored filter array and digital imaging sensor varies typically based on the manufacture of the digital camera. For example, some color filtered arrays use a pattern of yellow, cyan, green, and magenta. Typically, the digital camera has an image pipeline that performs a demosaicing or de-Bayering process on the image, lens correction, and an RGB contrast and saturation boost. Finally, a noise reduction process may be performed, and the data is encoded into the YCbCr family of color spaces or other format suitable for displaying and viewing.

Various considerations must be addressed when processing a digital image obtained with a digital camera, digital video camera, or other imaging device. One consideration involves preserving the spatial quality and the detail of the digital image, while another consideration involves sufficiently representing the color of the digital image. In many ways, these two considerations are interrelated.

Another well-known "boosting" technique used to render digital images more visually appealing is the use of tone-mapping curves. Tone mapping is a technique used in image processing and computer graphics to map one set of colors or image characteristics to another set of values, often to approximate the appearance of high dynamic range images in media with a more limited dynamic range. However, with conventional tone mapping techniques, one has to find a single tone curve that matches all possible scenes or has to get user input to select which tone curve is appropriate. Further, some conventional tone mapping techniques use symmetrical tone curves. These symmetrical tone curves would boost (or decrease) two data points equidistant from a mean input value by the same amount, regardless of whether the data point represented a lower-than-mean value or a higher-than-mean value. Prior art boosting techniques such as those described above could result in visually unappealing photos in certain scenes or light levels.

SUMMARY

In some embodiments, the present invention can include a low computational cost, efficient tone mapping algorithm that automatically takes scene information into account. In some embodiments, the tone mapping algorithm can boost low brightness and high brightness ranges of the image data independently from each other to create more visually appealing photos.

By examining the light-product information from a digital camera's sensor, one can detect sun-lit, high-light, and low-light scenes. The values needed for the light-product calculation may be determined by the digital camera's auto-exposure mechanism and can be stored in the image's metadata. Once the light-product value has been calculated, the tone mapping curve can be adjusted appropriately based on the scene. One advantage of this technique is that the tone mapping may be done in the digital camera sensor's processor itself, making this a low-cost computation. Alternatively, the automatic tone curve mapping method described below may be implemented in other hardware within the electronic device possessing the digital camera. To further increase efficiency, light-product information in the current image frame can be used to determine the tone curve for the next frame.

Because the exposure parameters in a typical digital camera or digital video camera are designed to change gradually, the tone curves can be changed gradually as well, producing no visually jarring changes for the user when the camera enters a different lighting condition. In one embodiment, to achieve this gradual changing of the tone curve, two predetermined tone curves can be stored—a tone curve for maximum, i.e., high-light, scenes and a tone curve for minimum, i.e., low-light scenes. A resultant tone curve may then be formed by blending between the predetermined tone curves based at least in part on the light-product data of the current image frame.

Further, independently varying the slopes of the tone mapping curve at the low end and high end of the curve can result in more visually appealing images. In one embodiment, by utilizing a non-symmetric curve for the tone mapping curve, it is possible to fix the tone mapping curve at two endpoints, say (0,0) and (1,1), and independently vary the slope at the (0,0) point, $S_0$, and the slope at the (1,1) point, $S_1$, by modifying various parameters of the tone mapping curve. By dynamically and independently selecting $S_0$ and $S_1$ slope values based on image metadata, more visually pleasing images can be generated.

DETAILED DESCRIPTION

This disclosure pertains to a device, method, computer useable medium, and processor programmed to automatically generate tone mapping curves in a digital camera or digital video camera based on image metadata in order to create more visually appealing images. While this disclosure discusses a new technique for automatically generating tone mapping curves in a digital camera or digital video camera based on image metadata in order to create more visually appealing images, one of ordinary skill in the art would recognize that the techniques disclosed may also be applied to other contexts and applications as well.

In some embodiments, performing tone-mapping in the camera's image sensor package (ISP) is computationally "free," that is, the data that is to be mapped through the use of tone mapping curves already gets mapped through a table to perform gamma correction. Thus, loading a different table which combines gamma correction and tone curve mapping has essentially no additional performance cost. Light-product information, as described above, or any number of other potential image processing parameters are available from the camera's image sensor package, thus no additional computationally expensive image analysis is necessary to determine the parameters of the tone curve that is to be used.

The present disclosure provides solutions to various digital camera image processing problems. For example, selecting tone curves based on light-product data avoids the problem of needing one tone mapping curve which fits all scenes. Further, independently varying the slopes at the endpoints of the tone mapping curves allows the image to present high-light and low-light scenes more pleasingly. Finally, because no user input is required to make this choice, there is no need to implement a user interface to select the type of scene the camera is looking at.

For cameras in embedded devices, e.g., digital cameras, digital video cameras, mobile phones, personal data assistants (PDAs), portable music players, and desktop or laptop computers, to produce more visually pleasing images, techniques such as those disclosed herein can improve image quality without incurring significant computational overhead or power costs.

Figure 1:
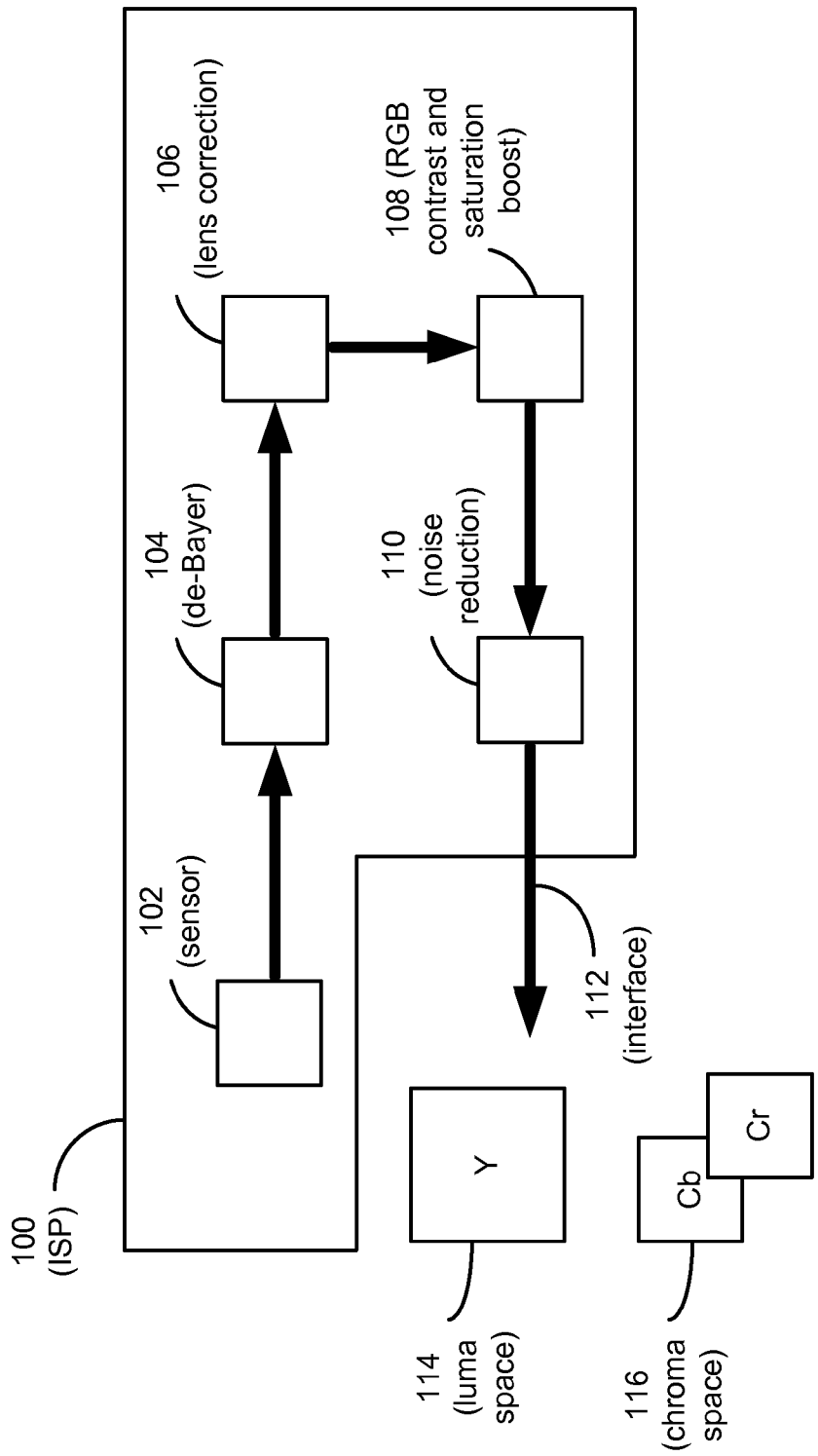
FIG. 1 illustrates a prior art image sensor package in accordance with one embodiment.

Referring to FIG. 1, a block diagram of one embodiment of a prior art ISP 100 is shown. The ISP 100 may include a digital image sensor 102, such as a CCD. Digital image sensor 102 may send its image information to a demosaicing or de-Bayering process element 104, as is well known in the art. Next, the ISP may perform lens correction 106 to correct the image for various lens distortions, including vignetting artifacts, i.e., light fall-off towards the edges of the frame, and color uniformity. The image data may then be sent to an RGB contrast and saturation boost process 108 before being passed through noise reduction filter 110 to correct for "noise" pixels. Increased noise in pixels is typically caused by the random arrival times of visible light photons to the sensor photosites, but may also be caused by the process of reading the pixel values from the sensor photosites, or for any number of other reasons, and is usually made worse by low light conditions. Finally, the image data may be encoded into the YCbCr family of color spaces and passed over interface 112 for any further processing and/or display by the digital camera. In YCbCr color space, the Y 114 stands for the luminance signal, i.e. brightness, the Cb stands for the "blue difference" chroma component, i.e. B-Y, and the Cr stands for the "red difference" chroma component, i.e., R-Y. The Cb and Cr values together are known as the "chroma space" 116.

Figure 2:
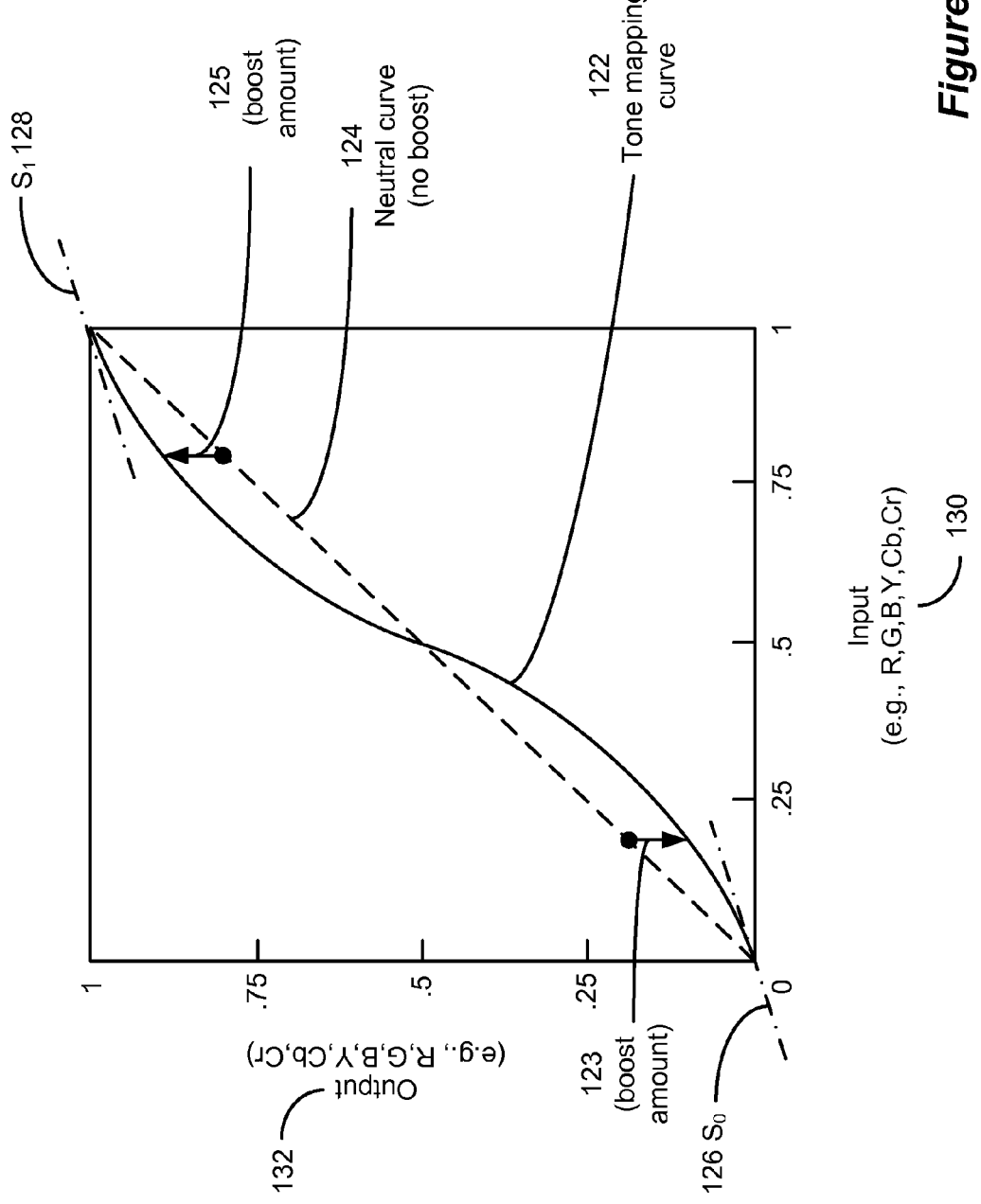
FIG. 2 illustrates a conventional tone mapping curve in accordance with one embodiment.

Referring now to FIG. 2, a conventional, symmetric tone mapping curve 122 is shown. Along the x-axis 130 of the graph is the input value of some component of the input signal (e.g., luminance), normalized to a range of 0 to 1, with 0 representing the darkest pixels and 1 representing the brightest pixels. Along the y-axis 132 of the graph is the output value of the same component of the input signal (e.g., luminance) that the image data will be mapped to, again normalized to a range of 0 to 1, with 0 representing the darkest pixels and 1 representing the brightest pixels. Applying a tone mapping curve separately to each component of a signal typically causes an increase in contrast and color saturation.

Neutral curve 124 represents a tone curve that would provide no boost to the input image. In other words, neutral curve 124 has a linear slope of 1. For example, pixels with a relative luminance value of 0.25 would stay at 0.25 in the output image; pixels with a relative luminance value of 0.75 would stay at 0.75 in the output image, and so forth for any input luminance value. Neutral curve 124 is shown on the graph to give a reference for how much boosting tone mapping curve 122 provides in the various luminance input regions.

In FIG. 2, the slope of tone mapping curve 122 at the value of zero along the x-axis, $S_0$ 126, is shown to be identical to the slope of tone mapping curve 122 at the value of one along the x-axis, $S_1$ 128, i.e., tone mapping curve 122 is a symmetrical tone mapping curve. The absolute difference between the values of tone mapping curve 122 and neutral curve 124 would be the same for any two pixels equidistant from the midpoint of the tone mapping curve 122. The boosting amounts 123 and 125 are shown at two such pixels that are equidistant from the center of tone mapping curve 122. Notice that the magnitude of both boosting amounts 123 and 125 appear to be substantially equal. In other words, the more shadowy areas of the image and the brighter areas of the image are boosted roughly the same amount, regardless of what light conditions the photo was taken in.

Figure 3:
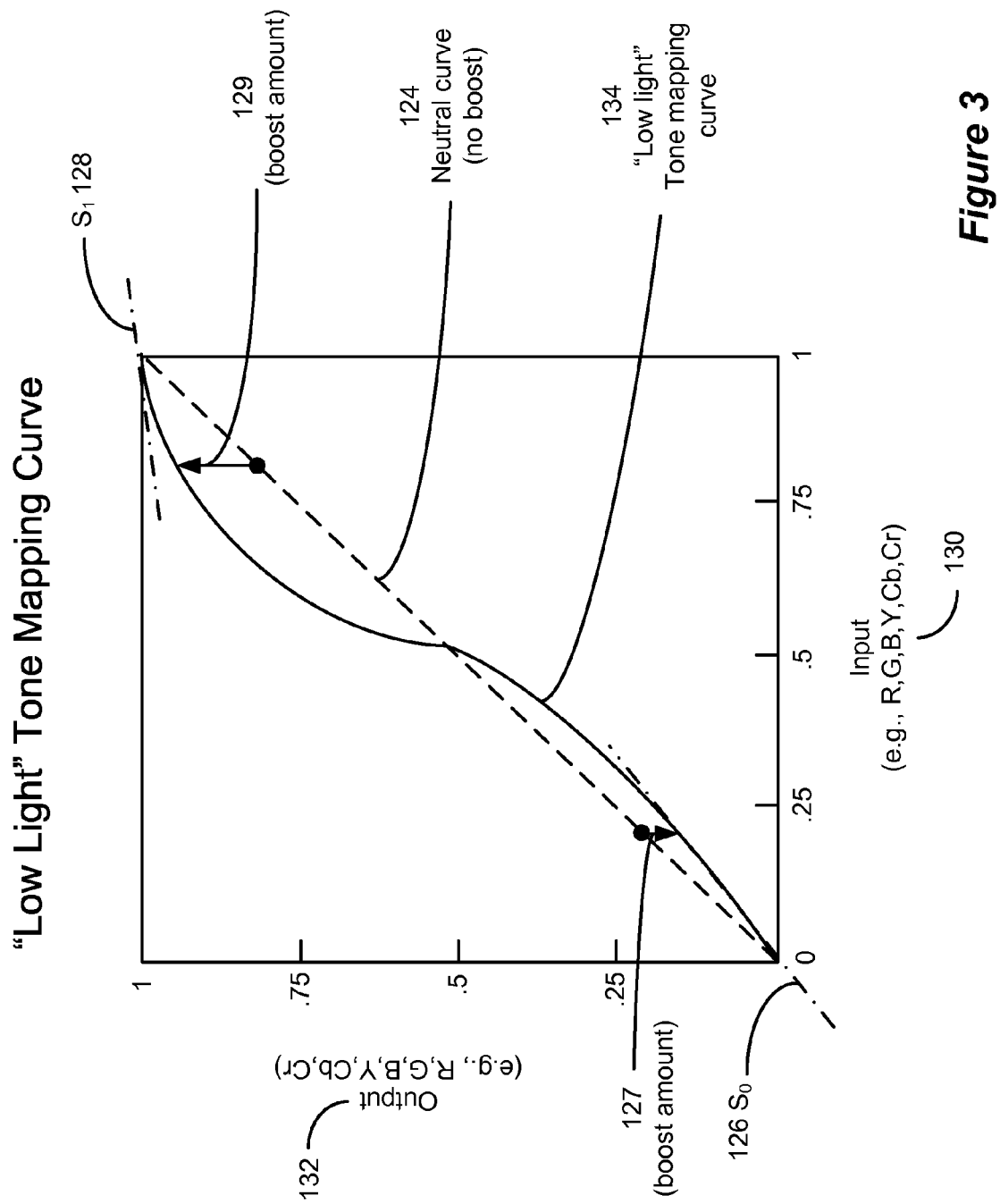
FIG. 3 illustrates a tone mapping curve that produces visually-appealing results in a low-light scene in accordance with one embodiment.

Referring now to FIG. 3, a conventional, "low light" tone mapping curve 134, as taught by the present disclosure, is shown. The boosting amounts 127 and 129 are shown at two pixels that are equidistant from the center of tone mapping curve 134. Notice that the magnitude of boosting amount 127 appears to be substantially smaller than the boosting amount 129, indicating that the more shadowy areas of the image will generally be boosted less than the brighter areas of the image by tone mapping curve 134.

As mentioned above, the camera's image sensor uses available image metadata to calculate an image processing parameter, such as, for example, a "light-product" value, for the image frame. The image metadata typically available to a camera's image sensor includes: exposure time, gain, ISO, lens aperture, exposure offset, and average gray value. In one embodiment, light-product can be defined as:

$$\text{LIGHT\_PRODUCT} = \left( \frac{(\text{EXPOSURE\_TIME})(ISO)}{(\text{LENS\_APERTURE})^2} \right). \quad \text{(Eqn. 1)}$$

In one embodiment, ISO can be proportional to the product of all internal gain factors.

As would be expected, light-product will be larger for bright scenes and smaller for dark scenes. The light-product becomes even simpler to calculate with a fixed aperture lens, for example, an image capturing device with a fixed aperture of f/2.8. It has been determined that in low-light conditions, i.e., those frames that would have a relatively small light-product value, making $S_0$ larger and $S_1$ smaller generally results in more visually appealing images. With a large $S_0$ value, input data with low levels of luminance, i.e., dark input, is altered by a relatively small amount. Pairing the large $S_0$ value with a small $S_1$ value simultaneously causes significant changes to input data with high levels of luminance, i.e., bright input. This has the favorable effect on the photo of not over-boosting the dark regions in an already dimly-lit photo while simultaneously boosting the brighter regions of the photo significantly to bring out those details of the photo in spite of the low light conditions.

Figure 4:
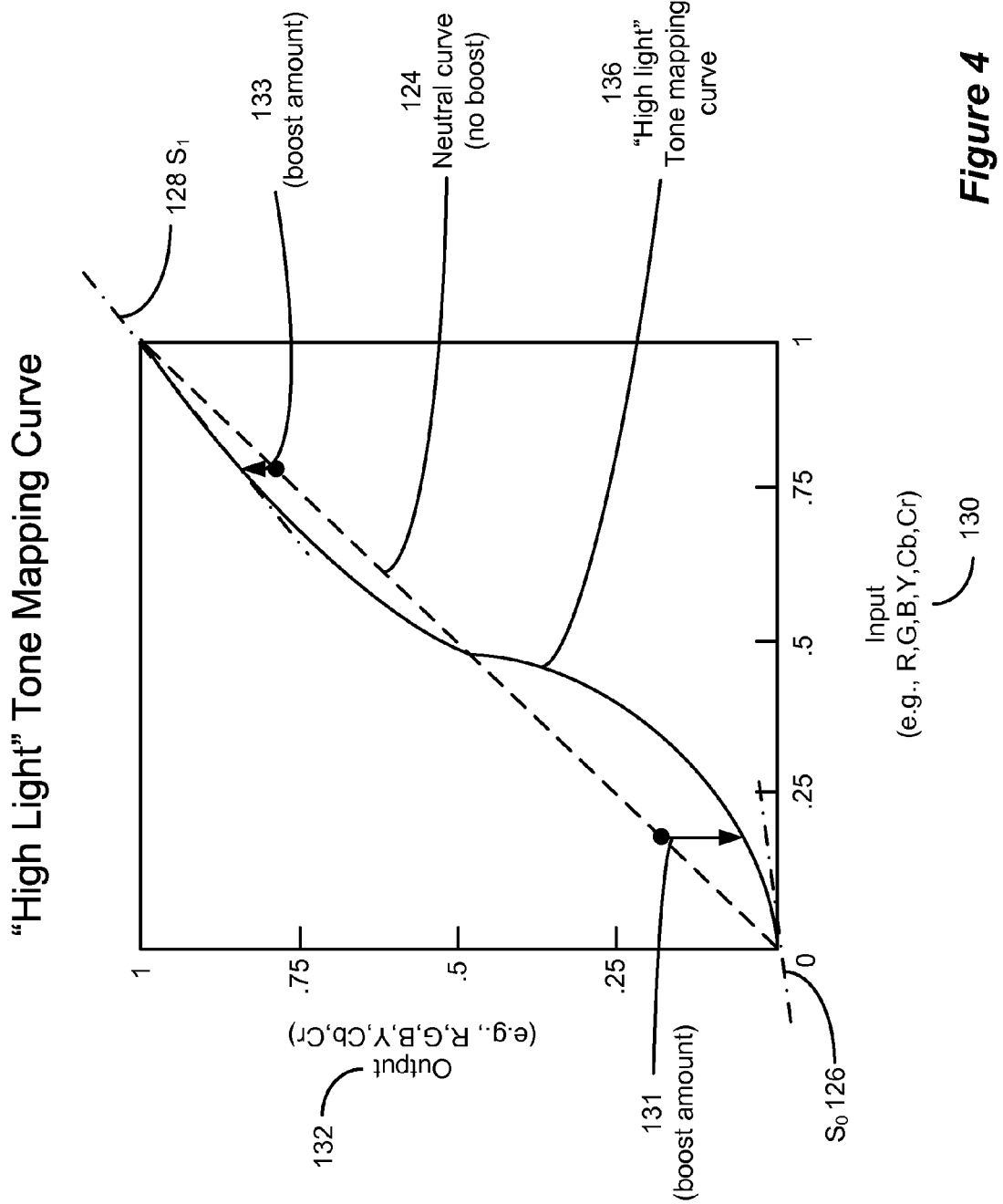
FIG. 4 illustrates a tone mapping curve that produces visually-appealing results in a high-light scene in accordance with one embodiment.

Referring now to FIG. 4, one embodiment of a "high light" tone mapping curve 136 as taught by the present disclosure is shown. The boosting amounts 131 and 133 are shown at two pixels that are equidistant from the center of tone mapping curve 136. Notice that the magnitude of boosting amount 133 appears to be substantially smaller than the boosting amount 131, indicating that the brighter areas of the image will generally be boosted less than the more shadowy areas of the image by tone mapping curve 136.

It has been determined that in high-light conditions, i.e., those frames that would have a relatively large light-product value, making $S_0$ smaller and $S_1$ larger generally results in more visually appealing images. With a large $S_1$ value, input data with high levels of luminance, i.e., bright input, is altered by a relatively small amount. Pairing the large $S_1$ value with a small $S_0$ value simultaneously causes significant changes to input data with low levels of luminance, i.e., dark input. This has the favorable effect on the photo of not over-boosting the bright regions in an already brightly-lit photo while simultaneously boosting the darker regions of the photo significantly to bring out those details of the photo in spite of the high light conditions.

By predetermining visually appealing minimum and maximum values of $S_0$ and $S_1$ for low-light and bright-light conditions, the improved ISP 150 (See FIG. 7) of the digital camera can then linearly interpolate between these extrema to set $S_0'$ and $S_1'$ for any given image based on that image frame's light-product value, yielding the equations:

$$S_0' = a_1 + (\text{LIGHT\_PRODUCT})(b_1) \quad \text{(Eqn. 2)}$$

and $$S_1' = a_2 + (\text{LIGHT\_PRODUCT})(b_2) \quad \text{(Eqn. 3),}$$

where a1, a2, b1, and b2 are constants that linearly relate the empirically-determined maximum and minimum values for $S_0$ and $S_1$. In other words, a1, a2, b1, and b2 could be chosen such that plugging in a minimum, i.e., low-light, light-product value to Equations 2 and 3 would result in $S_0'$ equaling the empirically determined maximum $S_0$ value and $S_1'$ equaling the empirically determined minimum $S_1$ value, whereas plugging in a maximum, i.e., high-light, light-product value to Equations 2 and 3 would result in $S_0'$ equaling the empirically determined minimum $S_0$ value and $S_1'$ equaling the empirically determined maximum $S_1$ value. The values of b1 and b2 could be chosen to linearly interpolate between the empirically determined minimum and maximum $S_0$ and $S_1$ values in order to calculate $S_0'$ and $S_1'$ values for tone mapping curves to be used with images having light-product values somewhere between extreme low-light and extreme high-light light-product values. Using Equations 2 and 3, the measured light-product for the current image frame can simply be plugged into the relevant equation, yielding visually appealing values of $S_0'$ and $S_1'$.

A further refinement to the calculation of $S_0'$ and $S_1'$ that can be implemented to improve image quality involves setting a maximum light-product value for the image sensor. One can calibrate a "brightest object" to an 18% gray card in direct sunlight. Then, any object in an image that appears brighter than this standard "brightest object" can be assumed to have a reflectance of more than 18%, and the light-product value can be limited to the pre-calculated maximum, i.e., the tone curve settings for "high light" scenes would be used for that image frame. Gray cards with reflectance values other than 18% may also be used to calibrate the "brightest object" in other embodiments.

Therefore, Equations 2 and 3 for calculating $S'_0$ and $S'_1$ above can be modified as follows:

$$S_0' = a_1 + (\text{LIGHT\_PRODUCT'})(b1) \quad \text{(Eqn. 4)}$$

and $$S_1' = a_2 + (\text{LIGHT\_PRODUCT'})(b2) \quad \text{(Eqn. 5),}$$

where:

$$\text{LIGHT\_PRODUCT'} = \text{MAX}(\text{LIGHT\_PRODUCT}, \text{LIGHT\_PRODUCT}_{N\%Grayscale}) \quad \text{(Eqn. 6),}$$

and N is the desired reflectance percentage of the "brightest object" used to calibrate the maximum light-product value.

Once the proper $S_0'$ and $S_1'$ values are known for a given image (based, for example, on the calculated light-product value), the entire tone mapping curve can be determined. In one embodiment, a non-symmetrical tone curve may be used. In another embodiment, a cubic polynomial may be used. A cubic polynomial has four degrees of freedom, that is, four values are needed to completely define a cubic curve. For example, the function:

$$f(x) = Ax^3 + Bx^2 + Cx + D \quad \text{(Eqn. 7)}$$

has variable coefficients A, B, C, and D. However, if the tone mapping curve has the form of a cubic polynomial that is "fixed" at two points, i.e., (0,0) and (1,1), there are really only two degrees of freedom to the tone mapping curve. Specifically, the value of D must be zero, and the sum of A+B+C must equal one.

The first derivative of the generic tone mapping polynomial curve of Equation 7 can be represented as:

$$f'(x) = 3Ax^2 + 2Bx + C \quad \text{(Eqn. 8)}$$

Thus, once the value of the first derivative, that is, the slope, of the curve at points x=0 (i.e., $S_0'$) and x=1 (i.e., $S_1'$) are known, the rest of the coefficient terms of the polynomial can be solved for. In other embodiments, a function other than a cubic polynomial can be used for the tone mapping curve, for example, a polynomial function of a higher or lower order, or a non-polynomial function, such as a piecewise-defined function. Further, any predetermined range and any set of end points may be used for the function. Once the parameters of the desired tone mapping curve are known, improved ISP 150 can generate a table of values representative of the newly determined tone mapping curve at tone curve generation module 140 (See FIG. 7) and provide this information to the digital camera's improved ISP 150 hardware package that can then use the tone mapping information to simultaneously provide tone curve mapping 145 and gamma boost correction 111 to the data provided by the image sensor. In an alternative embodiment, the application of the tone mapping curve and the gamma boost correction may also be performed separately. The table of generated values may consist of a table with 256 entries, with values going from 0 to 255. The tone curve mapping 145 described above offers a quick and computationally-efficient means for dynamically improving image quality based on light condition without introducing aberrations to the image caused by over-boosting skin tones.

Figure 5:
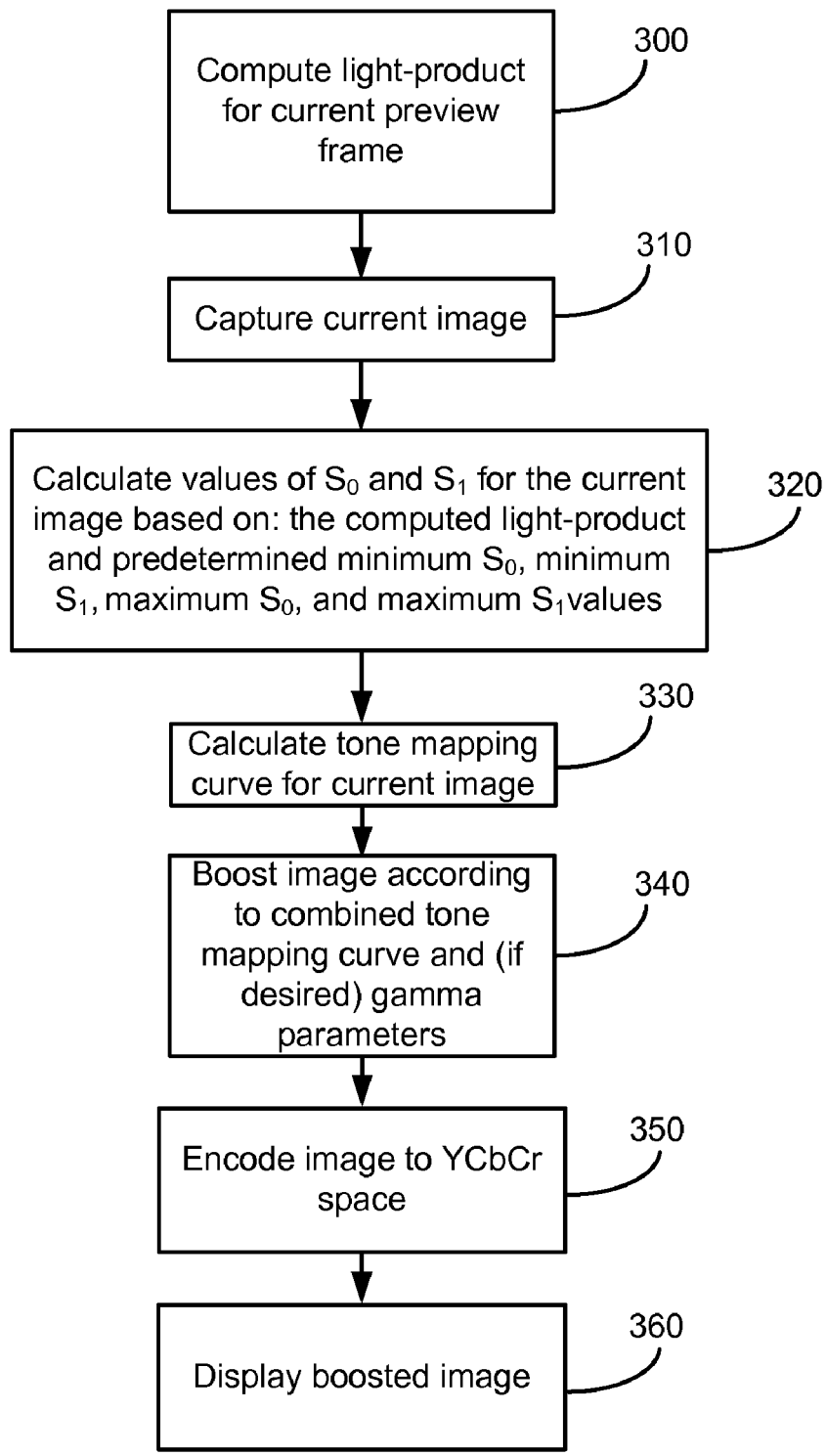
FIG. 5 illustrates, in flowchart form, one embodiment of a process for determining light product information and generating an appropriate tone mapping curve.

Referring now to FIG. 5, one embodiment of an improved automatic tone mapping algorithm for a digital camera or digital video camera is shown in flowchart form. First, the camera's ISP 150 computes the light-product (or other desired image processing parameter) for the current preview frame, e.g., according to Equation 1 above (step 300). Next, digital camera sensor 102 captures the current image frame (step 310). Next, the tone curve generation module 140 can interpolate values of $S_0$ and $S_1$ for the current image based on the calculated light-product of the image and the pre-determined minimum and maximum values of $S_0$ and $S_1$ which represent the "low-light" and "high light" curves (step 320). Then, a table of values that is representative of the generated tone mapping curve may be generated 140 (step 330). The generated table of representative tone mapping values 140 may then be provided to ISP 150's tone curve mapping 145 and combined boosting 111 modules (step 340). In these modules, the data from the two tables can be combined and then applied to the image data, i.e., the image can be "boosted" 111 according to the automatically determined tone curve. As an alternative to generating a table of values representative of the generated tone mapping curve, ISP 150 may instead by given the necessary information, i.e., the coefficients, to generate the tone mapping curve data itself. In this alternative embodiment, ISP 150 could then individually calculate the boost amount for each pixel in the image and then pass on the boosted data to combined boost module 111. Finally, the boosted image data may be encoded into the YCbCr color space (step 350) and sent out over interface 112 to the device's graphics display hardware 148 for displaying (step 360).

Figure 6:
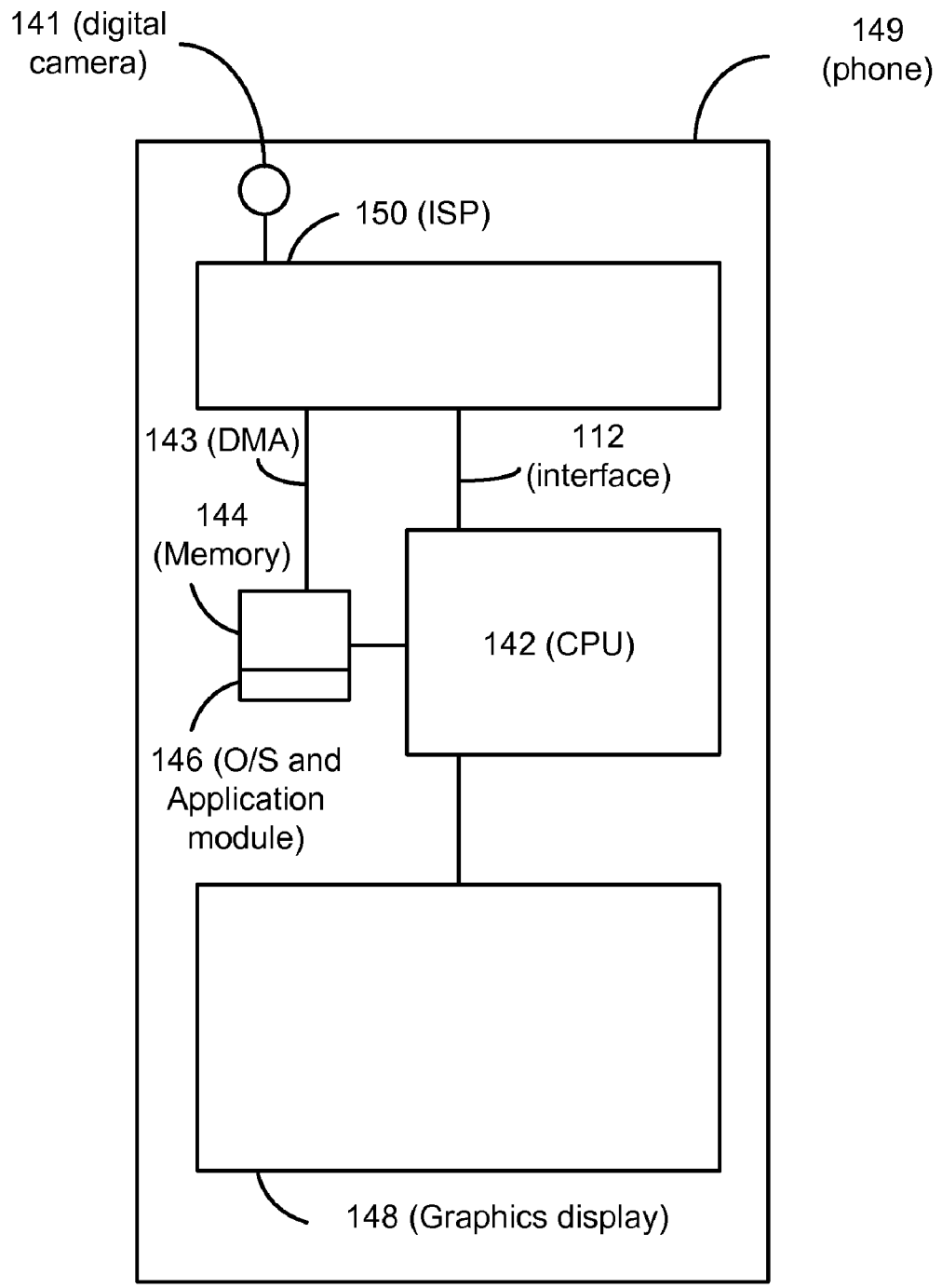
FIG. 6 illustrates one embodiment of an apparatus possessing an improved image sensor package for the determination of light product information and automatic generation of an appropriate tone mapping curve.

Referring now to FIG. 6, one embodiment of an apparatus possessing an improved image sensor package 150 for the determination of light product information and automatic generation of an appropriate tone mapping curve is shown. In this embodiment, a digital camera comprising a camera sensor unit 141 configured for taking still images or video may be integrated into a multimedia device, such as a mobile phone 149. Improved ISP 150 may communicate with mobile phone 149's central processing unit (CPU) 142 via data interface 112. CPU 142 may communicate with memory unit 144, which, for example, stores the necessary predetermined image processing constants such as maximum light-product, minimum $S_0$, maximum $S_0$, minimum $S_1$, maximum $S_1$, a1, a2, b1, and b2. In one embodiment, the image data output from ISP 150 is sent to memory unit 144 using direct memory access (DMA) 143. Memory unit 144 is one example of a computer readable medium wherein instructions for carrying out the automatic tone mapping procedure described above may be stored (i.e., tangibly embodied), and it may consist of ROM, EEPROM, Flash memory, or any other suitable type of non-volatile storage medium. Within memory unit 144 may be operating system and application module 146, which provides operating system services and the framework for other applications and services offered by phone 141, e.g., word processing, address book, email, telephone, and photo viewing applications. The image data that has been boosted according to the automated tone mapping curves as described above may then be sent out over interface 112 to phone 149's graphic display module 148 so that the image is rapidly displayed to the user. Any of the blocks shown in FIG. 6 may potentially be consolidated, even though shown separately in FIG. 6. For example, blocks 144 and 146 may be consolidated with block 142. In other embodiments, the digital camera may be embedded in any of a variety of electronic consumer devices, e.g., digital cameras, digital video cameras, PDAs, portable music players, and desktop or laptop computers, whose processors may be similarly programmed to perform the automatic tone mapping techniques described herein.

Figure 7:
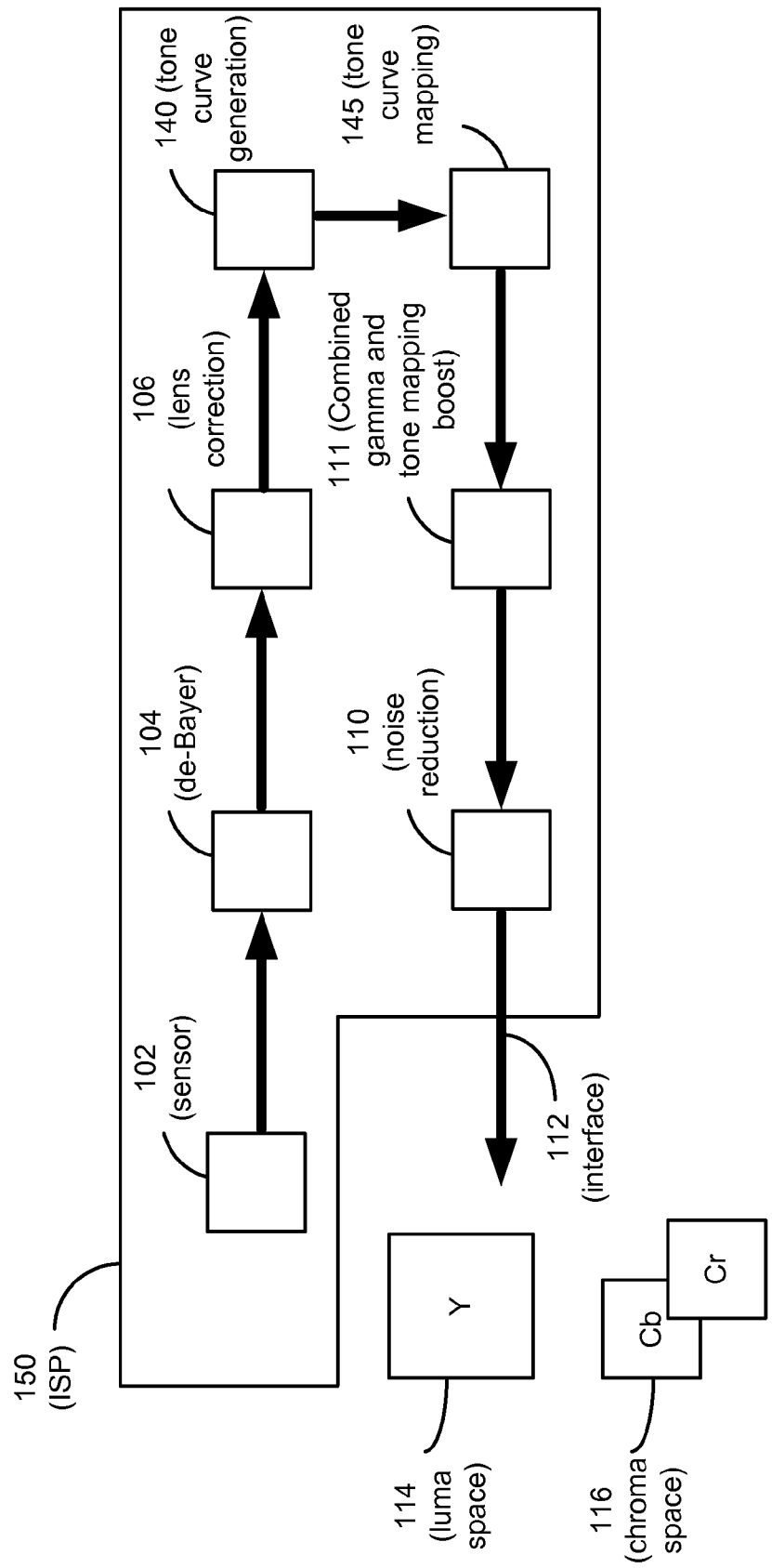
FIG. 7 illustrates an improved image sensor package for automatic tone mapping in accordance with one embodiment.

Referring to FIG. 7, a block diagram of one embodiment of an improved ISP 150 is shown. The ISP 150 may include a digital image sensor 102, a demosaicing or de-Bayering process 104, and a lens correction module 106. The image data may then be sent to tone curve generation module 140 where the light-product value or other image processing parameter is calculated, and a table of values representative of the appropriate tone mapping curve may be generated 145, as was described above. The tone curve mapping data 145 may then be combined with data representative of the appropriate RGB gamma boost correction curve, and the image may be boosted according to the combined table of values 111. Finally, a noise reduction filter 110 may be applied to the image data. As mentioned above, as an alternative to generating a table of values representative of the generated tone mapping curve, ISP 150 may instead by given the necessary information, e.g., the coefficients, to generate the tone mapping curve data itself. ISP 150 could then individually calculate the boost amount for each pixel in the image and then pass on the boosted data to combined boost module 111. Finally, the image data may be encoded into the YCbCr family of color spaces and passed over interface 112 for any further processing and/or display.

The foregoing description of preferred and other embodiments is not intended to limit or restrict the scope or applicability of the inventive concepts conceived of by the Applicants. As one example, although the present disclosure focused on RGB Bayer pattern and the RGB color space, it will be appreciated that the teachings of the present disclosure can be applied to other implementations of colored filter arrays and color spaces. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A computer processor programmed to perform an image processing method, the method comprising:
   obtaining an image representative of a physical scene and comprising metadata;
   calculating a first image processing parameter based at least in part on the metadata of the image;
   determining first and second slope values of a tone mapping curve, wherein the first and second slope values are based at least in part on the generated first image processing parameter, and wherein the first and second slope values are representative of the slope of the tone mapping curve at a first and second endpoint, respectively; and
   transforming the image according to the tone mapping curve having the first and second slope values.

2. The processor of claim 1, wherein the act of determining the first and second slope values that the processor is programmed to perform further comprises generating a table of values representative of the tone mapping curve between the first and second endpoints.

3. The processor of claim 1, wherein the processor is further programmed to perform the act of encoding the transformed data representative of the image into the YCbCr color space.

4. The processor of claim 1, wherein the first image processing parameter comprises a light-product.

5. The processor of claim 1, wherein the act of determining the first and second slope values that the processor is programmed to perform further comprises linearly interpolating between a first stored pair of first and second slope values representative of low-light conditions and a second stored pair of first and second slope values representative of highlight conditions.

6. The processor of claim 2, wherein the processor is further programmed to perform the act of combining the generated table of values representative of the tone mapping curve with a second table of values indicative of gamma correction, wherein the act of combining occurs before the act of transforming.

7. The processor of claim 1, wherein the act of obtaining an image representative of a physical scene comprises receiving an image from at least one of the following: a digital camera, digital video camera, mobile phone, personal data assistant, portable music player, and computer.

8. The processor of claim 1, wherein the tone mapping curve comprises a cubic polynomial.

9. A consumer electronic device with an embedded camera, comprising:

a camera sensor unit;

memory operatively coupled to the camera sensor unit for receiving an image representative of a physical scene and comprising metadata from the camera sensor unit;

a processor unit operatively coupled to the memory, the memory comprising instructions for causing the processor unit to:

calculate a first image processing parameter based at least in part on the metadata of the image;

determine first and second slope values of a tone mapping curve, wherein the first and second slope values are based at least in part on the generated first image processing parameter, and wherein the first and second slope values are representative of the slope of the tone mapping curve at a first and second endpoint, respectively; and transform the image according to the tone mapping curve having the first and second slope values.

10. The consumer electronic device of claim 9, wherein the act of determining the first and second slope values that the processor is programmed to perform further comprises generating a table of values representative of the tone mapping curve between the first and second endpoints.

11. The consumer electronic device of claim 9, wherein the first image processing parameter comprises a light-product.

12. The consumer electronic device of claim 9, wherein the act of determining the first and second slope values that the processor is programmed to perform further comprises linearly interpolating between a first stored pair of first and second slope values representative of low-light conditions and a second stored pair of first and second slope values representative of high-light conditions.

13. The consumer electronic device of claim 10, wherein the processor unit is further programmed to combine the generated table of values representative of the tone mapping curve with a second table of values indicative of gamma correction, wherein the act of combining occurs before the act of transforming.

14. The consumer electronic device of claim 9, wherein the tone mapping curve comprises a cubic polynomial.

15. The consumer electronic device of claim 9, wherein the consumer electronic device comprises at least one of the following: a digital camera, digital video camera, mobile phone, personal data assistant, portable music player, and computer.

16. An image processing method comprising:

generating an image processing parameter for an image representative of a physical scene, the image processing parameter based at least in part on metadata of the image;

determining a tone mapping curve, wherein the tone mapping curve has a first slope value at a first endpoint and a second slope value at a second endpoint, and wherein the first and second slope values are independently determined at least in part by the image processing parameter; and transforming the image according to the tone mapping curve having the first and second slope values.

17. The method of claim 16, wherein the act of determining further comprises generating a table of values representative of the tone mapping curve between the first and second endpoints.

18. The method of claim 16, wherein the act of determining further comprises linearly interpolating between a first stored pair of first and second slope values representative of low-light conditions and a second stored pair of first and second slope values representative of high-light conditions.

19. The method of claim 17, wherein the method further comprises the act of combining the generated table of values representative of the tone mapping curve with a second table of values indicative of gamma correction, wherein the act of combining occurs before the act of transforming.

20. A computer usable medium having a computer readable program code embodied therein, wherein the computer readable program code is adapted to be executed to implement the method performed by the programmed computer processor of claim 1.

21. A computer processor programmed to perform an image processing method, the method comprising:

obtaining an image representative of a physical scene and comprising metadata;

calculating a first image processing parameter based at least in part on the metadata of the image;

determining a non-symmetric tone mapping curve based at least in part on the first image processing parameter, wherein the non-symmetric tone mapping curve has first and second endpoints, and wherein the act of determining the non-symmetric tone mapping curve comprises linearly interpolating between a first stored pair of first and second slope values representative of low-light conditions and a second stored pair of first and second slope values representative of high-light conditions;

specifying a value for the first and second endpoints; and transforming the image according to the non-symmetric tone mapping curve having the first and second endpoints.

22. The processor of claim 21, wherein the act of determining the non-symmetric tone mapping curve that the processor is programmed to perform further comprises generating a table of values representative of the tone mapping curve between the first and second endpoints.

23. The processor of claim 21, wherein the first image processing parameter comprises a light-product.

24. The processor of claim 22, wherein the processor is further programmed to perform the act of combining the generated table of values representative of the tone mapping curve with a second table of values indicative of gamma correction, wherein the act of combining occurs before the act of transforming.

* * * * *